United States Patent
Gadat et al.

(10) Patent No.: US 8,780,975 B2
(45) Date of Patent: Jul. 15, 2014

(54) METHOD AND DEVICE FOR ADAPTING THE THROUGHPUT OF A COMPRESSED VIDEO STREAM TRANSMITTED IN A CONSTRAINED ENVIRONMENT

(75) Inventors: Benjamin Gadat, Ville (FR); Cyril Bergeron, Colombes (FR); Poulliat Charly, Toulouse Cedex (FR); Gomez Cécile, Colombes (FR)

(73) Assignee: Thales, Neuilly sur Seine (FR)

( * ) Notice: Subject to any disclaimer, the term of this patent is extended or adjusted under 35 U.S.C. 154(b) by 425 days.

(21) Appl. No.: 13/334,562

(22) Filed: Dec. 22, 2011

(65) Prior Publication Data

US 2012/0328016 A1 Dec. 27, 2012

(30) Foreign Application Priority Data

Dec. 23, 2010 (FR) .................................. 10 05077

(51) Int. Cl.
*H04N 7/50* (2006.01)
*H04N 7/12* (2006.01)
*H04N 11/02* (2006.01)

(52) U.S. Cl.
USPC ............ 375/240.01; 375/240.16; 375/240.26; 375/240.27; 375/296

(58) Field of Classification Search
CPC ............ H04N 7/12; H04N 7/50; H04N 11/02
See application file for complete search history.

(56) References Cited

U.S. PATENT DOCUMENTS

| 2003/0012279 | A1* | 1/2003 | Chaddha ................. 375/240.12 |
| 2003/0202579 | A1* | 10/2003 | Lin et al. ................. 375/240.03 |
| 2005/0071876 | A1* | 3/2005 | van Beek .................... 725/62 |
| 2005/0175084 | A1* | 8/2005 | Honda et al. ............. 375/240.01 |
| 2005/0190794 | A1* | 9/2005 | Krause et al. ................ 370/485 |
| 2007/0047659 | A1* | 3/2007 | Aleksic .................... 375/240.25 |
| 2009/0118018 | A1* | 5/2009 | Perlman et al. ................ 463/42 |
| 2010/0189063 | A1 | 7/2010 | Kokku et al. |

FOREIGN PATENT DOCUMENTS

| EP | 1494482 A1 | 1/2005 |
| FR | 2944935 A1 | 10/2010 |
| WO | 2010/124949 A1 | 11/2010 |

OTHER PUBLICATIONS

Qi Wang, et al., "A New Rate Allocation Scheme for Progressive Fine Granular Scalable Coding", The 2001 IEEE International Symposium on Circuits and Systems, May 6-9, 2001, pp. 397-400, vol. 2, IEEE Service Center, Piscataway, NJ, US, XP010540662.

T. Tuithung, et al., "New Approaches for Video Transcoding in the Compressed Domain", 15th International Conference on Advanced Computing and Communications, Dec. 1, 2007, pp. 654-659, XP55002182.

Cyril Bergeron, et al., "Modelling H264/AVC Sensitivity for Error Protection in Wireless Transmissions", 2006 IEEE 8th Workshop on Multimedia Signal Processing, Oct. 3, 2006, pp. 302-305, No. 8th, XP002592830.

* cited by examiner

*Primary Examiner* — Joseph Ustaris
*Assistant Examiner* — Maryam Nasri
(74) *Attorney, Agent, or Firm* — Baker Hostetler LLP

(57) ABSTRACT

A method is provided for adapting the throughput of a video stream comprising a plurality N of compressed images with a plurality of spatial resolutions and/or a plurality of quality layers, the images being compressed separately from one another.

12 Claims, 3 Drawing Sheets

METHOD AND DEVICE FOR ADAPTING THE THROUGHPUT OF A COMPRESSED VIDEO STREAM TRANSMITTED IN A CONSTRAINED ENVIRONMENT

CROSS-REFERENCE TO RELATED APPLICATION

This application claims priority to foreign French patent application No. FR 1005077, filed on Dec. 23, 2010, the disclosure of which is incorporated by reference in its entirety.

FIELD OF THE INVENTION

The present invention pertains to a method and a device for adapting the throughput of a compressed video stream with a view to transmission on a channel with constrained throughput. It applies advantageously to a video stream for which each image is compressed separately from the others, that is to say without taking into account the temporal redundancies that may exist and without applying motion prediction schemes. The invention applies notably to video streams compressed with the aid of the "Motion JPEG" or "Motion JPEG 2000" standards.

In the subsequent description, reference will be made to the Motion JPEG2000 or M-JPEG2000 standard, it being understood that the invention applies in an identical manner to any similar image or video coder for which each image is compressed separately inside the video stream.

BACKGROUND

One of the problems which the invention seeks to solve relates to the adaptation of the characteristics of an M-JPEG2000 compressed stream to the constraints of a transmission channel with limited throughput, typically a radio transmission channel. A compressed stream delivered by a JPEG2000 coder possesses the capacity to group together, in one and the same stream, several versions of the same image with various resolutions but also with various levels of quality. One conventionally speaks of scalability to designate the capacity of a source coder to produce, in a single stream, several versions of the same image that are accessible to the user. In particular, a stream compressed according to the M-JPEG2000 standard is a stream with multiple spatial resolutions. It is conventionally composed of sub-bands obtained subsequent to the application of a wavelet transform to an image. Each sub-band represents the original image at a lower resolution. Knowing the maximum throughput available on the transmission link, it is possible to adapt the compressed stream by deleting certain sub-bands so as to comply with the constrained throughput. The compressed stream resulting from this adaptation will culminate, after decoding, in an image of lower resolution. A problem to be solved in this context relates to the selection of the sub-bands to be transmitted so as to minimize the distortion induced on the final image. The throughput adaptation can also be performed, conversely, by increasing the total throughput of the stream by applying an error-correcting code to one or more sub-bands so as to minimize the distortion resulting from the impact of transmission errors on these sub-bands.

Moreover, M-JPEG decoders make it possible to implement error masking techniques relying on the temporal correlation existing between several successive images. Thus, certain parts of a decoded image may be reconstructed on the basis of the information present in one or more earlier images in the stream. The temporal redundancy existing between certain successive images may be utilized upstream so as to reconstruct with the maximum resolution an image received with a lower resolution.

The applicant's French patent application published under the number FR2944935 is known. It describes a method for estimating the throughput and the distortion of an image compressed by a source coder of JPEG2000 type. This method makes it possible to estimate the distortion induced by the impact of transmission errors on certain parts of a JPEG 2000 compressed stream. On the other hand, it does not take into account the capacity of an M-JPEG 2000 decoder to mask the errors resulting from the entire loss of a sub-band on the basis of compensation of motion between a key image and the image received.

SUMMARY OF THE INVENTION

The present invention proposes a device and a method making it possible to finely adapt the throughput of an M-JPEG2000 compressed stream by estimating the final impact in terms of distortion of the loss of a sub-band or of the transmission of one or more images of the stream with a lower resolution.

The invention takes into account the capacity of the decoder to compensate for errors on the basis of the temporal correlation between two successive images.

The invention makes it possible to adapt the throughput of each image so as to minimize the global distortion of the video sequence.

The invention is implemented on a compressed stream and may be executed in a source coder delocalized transcoding device.

The subject of the invention is notably a method for adapting the throughput of a video stream comprising a plurality N of compressed images $Ic_n$ with a plurality of spatial resolutions and/or a plurality of quality layers, the said images being compressed separately from one another, characterized in that it comprises at least the following steps:

defining at least one key image $I_0$ from among the said images that the stream comprises, for each current compressed image $Ic_n$ and for each truncation point k corresponding to a spatial resolution and/or a quality layer available for this image, executing the following steps:

truncating the said current compressed image $Ic_n$ at the said truncation point k so as to produce a compressed and truncated image $Ic^k_n$ consuming a throughput $D^k_n$, decompressing the compressed key image $Ic_0$, the current compressed image $Ic_n$ and the compressed and truncated image $Ic^k_n$, determining at least one information item regarding compensation of motion between the truncated key image ($I^k_0$) and the truncated current image ($I^k_n$), applying the said motion compensation information item or items to the key image ($I_0$) to obtain a reconstructed image ($IR_n$) with the spatial resolution and/or quality layer of the key image ($I_0$), determining an estimate of the distortion $\Delta^k_n$ between the reconstructed image $IR_n$ and the decompressed current image $I_n$, determining for all the images $I_n$ of the said video stream, except for the key image or images $I_0$, the optimum truncation points $k"_{opt}$ which minimize the sum of the distortions $$\sum_{n=1}^{N} \Delta_n^{k_{opt}^n}$$

and which comply with the following inequality $$\sum_{n=1}^{N} D_n^{k_{opt}^n} < D_{target} - D_{I_0}$$

with $D_{target}$ the maximum throughput that can be consumed by the video stream and $D_{I_0}$ the throughput consumed by the key image or images $Ic_0$, producing a throughput-adapted compressed video stream, composed of the key image or images $Ic_0$ and of the compressed images truncated $Ic_n^k$ at the said optimum truncation points $k_{opt}^n$.

In a particular aspect of the invention, the distortions $\Delta_n^k$ are determined by a mean square error or PSNR calculation.

In a variant embodiment the method according to the invention furthermore comprises the following steps:

determining, for each current compressed image $Ic_n$, for each truncation point k and for each rate $R_i$ of corrector codes, taken from a given set of corrector codes, the throughput $$D_n^{i,k} = \frac{D_n^k}{R_i}$$

consumed by the said compressed image $Ic_n$ protected by the said corrector code of rate $R_i$, determining, for each current compressed image $Ic_n$, for each truncation point k and for each rate $R_i$ of corrector codes, an estimate of the distortion $\Delta_n^{i,k}$ between on the one hand an image reconstructed $IR_n$ on the basis of the key image $I_0$ and of the compressed, truncated image $Ic_n^k$, protected by the said corrector code and corrupted by errors whose probability of occurrence $P_{ae}$ is known and on the other hand the decompressed current image $I_n$, determining for all the images $I_n$ of the said video stream, except for the key image or images $I_0$, the corrector codes of optimum rates $R_{i_{opt}^n}$ which minimize the sum of the distortions $$\sum_{n=1}^{N} \Delta_n^{i_{opt}^n, k_{opt}^n}$$

and which comply with the following inequality $$\sum_{n=1}^{N} D_n^{i_{opt}^n, k_{opt}^n} < D_{target} - D_{I_0},$$

producing a throughput-adapted compressed video stream, composed of the key image or images $Ic_0$ and of the compressed images truncated $Ic_n^k$ at the said optimum truncation points $k_{opt}^n$ and protected by the corrector codes of optimum rate $R_{i_{opt}^n}$.

In a variant embodiment of the invention, the distortion $\Delta_n^{i,k}$ is determined with the aid of the following relation $\Delta_n^{i,k} = (1-P_{ae}^i)^{T_{n,k,i}} \cdot \Delta_n^k + (1-(1-P_{ae}^i)^{T_{n,k,i}}) \cdot \Delta_{0,n}^k$, with $P_{ae}^i$ the given probability of error occurrence for a corrector code rate $R_i$ and a target signal-to-noise ratio, $T_{n,k,i}$ the size, in bits, of the compressed truncated image $Ic_n^k$ protected by the corrector code of rate $R_i$ and $\Delta_{0,n}^k$ the distortion engendered when the compressed truncated image $Ic_n^k$ is totally corrupted or lost.

In a variant embodiment of the invention, the key image $I_0$ is initially chosen as the first image of the said video stream and is updated to the current image $I_n$ when the distortion exceeds a given threshold.

In a variant embodiment of the invention, the images of the said video stream are compressed with the aid of the M-JPEG 2000 standard.

The subject of the invention is also a throughput adaptation device adapted for receiving a video stream comprising a plurality of compressed images $Ic_n$ with a plurality of spatial resolutions and for delivering a compressed video stream whose throughput is less than a target throughput and whose mean distortion is minimized, the said device comprising means adapted for implementing the method according to the invention.

BRIEF DESCRIPTION OF THE DRAWINGS

Other characteristics and advantages of the invention will become apparent with the aid of the description which follows in conjunction with appended drawings which represent.

DETAILED DESCRIPTION

Figure 1:
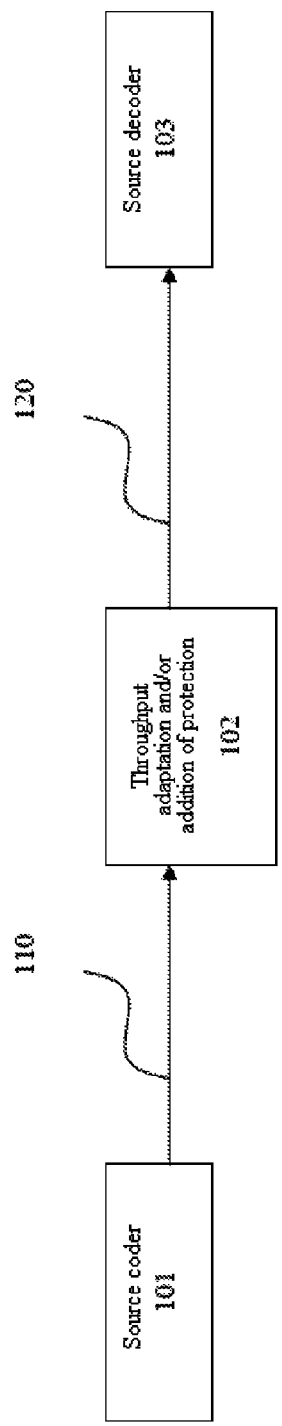
FIG. 1, a schematic of a chain for transmitting a compressed video stream comprising a throughput adaptation device according to the invention, FIG. 2, a flowchart illustrating the method according to a first embodiment of the invention, FIG. 3, a schematic of a throughput adaptation device according to the invention.

FIG. 1 describes a schematic of a chain for transmitting a compressed video stream. A source coder 101 carries out the compression of a video sequence comprising a plurality of images. This compression is performed for example while complying with the M-JPEG or M-JPEG2000 standard. The resulting compressed stream is transmitted through a first propagation channel 110, advantageously a wire-based channel with unconstrained throughput and is then received by a device 102, according to the invention, for adapting the throughput of the said compressed stream. Such an adaptation is carried out by decreasing the useful throughput of the stream through the deletion of some of its components or/and by increasing the total throughput through the insertion of redundancy data with a view to protecting this or that part of the stream. The device 102 according to the invention produces as output an adapted compressed stream which is transmitted on a propagation channel 120 with constrained throughput. At the extremity of the chain, the stream is received by a source decoder 103 which carries out the decoding of the compressed stream and optionally the reconstruction of a part of the stream by error masking.

Figure 2:
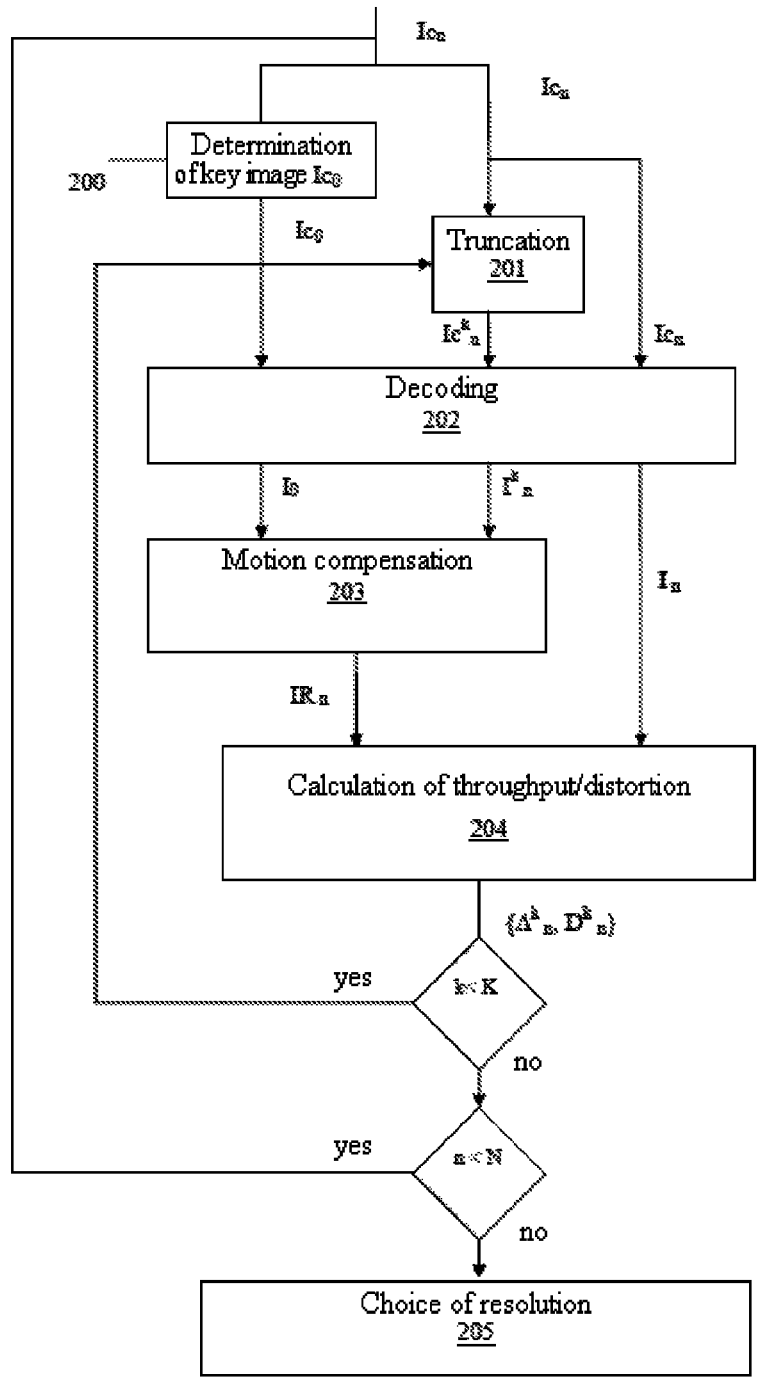

FIG. 2 represents, in the form of a flowchart, the method according to the invention, implemented by the throughput adaptation device 102. In a prior step 200, an image, from among the plurality of images making up the received video stream, is selected as key image $I_0$. This image is transmitted fully and consumes a given throughput $D_{I_0}$. The key image $I_0$ serves thereafter as reference image for estimating the motion between this image and a subsequent image in the stream. In a particular mode of the invention, the key image is chosen initially as being the first image of the video stream and is then updated during the method according to modalities described subsequently.

The method according to the invention is aimed notably at adapting the throughput transmitted for each compressed image. For an image $I_n$ subsequent to the key image $I_0$ within the stream, a truncation step 201 is applied. The compressed image $Ic_n$ is composed, notably, of a plurality of sub-bands each relating to a given spatial resolution or quality layer. The truncation step 201 consists in deleting one or more sub-bands of the compressed stream, or any other equivalent element of the compressed stream, with the aim of producing a compressed stream containing the original image with a different spatial resolution and/or with a different level of quality. Hereinafter the index k will designate a truncation point associated with a particular spatial resolution and/or a quality layer from among those actually available in the compressed stream corresponding to the image $Ic_n$. This index is used for purely descriptive purposes and does not presume a particular hierarchy in the spatial resolutions or the quality layers. For the sake of simplicity, the invention is now described by considering solely a truncation of the stream culminating in a variation of the spatial resolution. Step 201 consists in truncating one or more sub-bands of the compressed image $Ic_n$, in such a way that the truncated compressed image $Ic^k_n$ corresponds to a decoded image of resolution k.

In a step 202, the compressed key image $Ic_0$, the compressed image $Ic_n$ and the truncated compressed image $Ic^k_n$ are decoded so as to produce a decoded key image $I_0$, a decoded current image $I_n$ and a decoded current image $I^k_n$ with the spatial resolution k.

In a step 203, an estimation and a motion compensation is carried out between the truncated key image $I^k_0$ and the truncated current image $I^k_n$ with the spatial resolution k. One or more motion compensation information items may be generated for one or more zones of the image. A reconstructed image $IR_n$ with the highest resolution n is thereafter obtained by applying the motion compensation information item or items to the key image $I_0$, previously adapted to the resolution n by oversampling. If the motion between the key image $I_0$ and the current image $I_n$ is weak or homogeneous in a limited number of zones of the image then the motion compensation step 203 makes it possible to generate a reconstructed image $IR_n$ which is very close to the current image $I_n$ with the highest spatial resolution, that is to say that of the key image $I_0$. Conversely if the motion between the two images is significant or quasi-random then the reconstructed image $IR_n$ will exhibit high distortion with the current image $I_n$. Advantageously, the scheme used to estimate and compensate for the motion is the same as that carried out ultimately by the decoder 103. Any known scheme making it possible to estimate the motion between two images of a video stream and making it possible to produce a motion compensation vector is compatible with the invention.

In a step 204, a distortion $\Delta^k_n$ is calculated between the image $IR_n$ reconstructed on the basis of the current image $I^k_n$ decoded with the associated resolution of index k and the current image $I_n$. With this distortion is associated the useful throughput $D^k_n$ of the truncated compressed image $Ic^k_n$. The distortion $\Delta^k_n$ is, for example, taken equal to the mean square error between the two images or to the measurement of the PSNR ("Peak Signal to Noise Ratio"). The distortion $\Delta^k_n$ is calculated on the basis of the image $IR_n$ reconstructed after motion compensation since, ultimately, the decoder 103 will also carry out this motion compensation step, also called the error masking step, and the decoded image produced will be the image $IR_n$ and not the image $I^k_n$ truncated with a lower resolution.

Steps 201, 202, 203, 204 are repeated for the set K of sub-bands available for the compression of the current image $I_N$.

When all the pairs $\{\Delta^k_n, D^k_n\}$ of distortion and throughput have been calculated for an image, the method is repeated for the set N of images which make up the stream.

In a final step 205, a choice of throughput adaptation is carried out by selecting the most optimum truncation point, of index $k^n_{opt}$, for each image of the stream. This selection is carried out so as to minimize the sum of the distortions that were estimated in step 204 for each image while guaranteeing that the total throughput of the compressed stream is less than a maximum throughput equal to the throughput available on the transmission link minus the throughput $D_{I_0}$ consumed by the optionally slightly compressed key image $I_0$. Step 205 therefore consists in determining the set of indices $\{k^n_{opt}\}$ for n varying between 1 and N which minimizes the sum $$\sum_{n=1}^{N} \Delta^{k^n_{opt}}_n$$

while complying with the inequality $$\sum_{n=1}^{N} D^{k^n_{opt}}_n < D_{target} - D_{I_0}.$$

The determination of the set of indices $\{k^n_{opt}\}$ is, for example, carried out by enumerating all the possible configurations of the sums $$\sum_{n=1}^{N} \Delta^k_n$$

and $$\sum_{n=1}^{N} D^k_n$$

by selecting the set which complies with the aforementioned optimization constraints.

The truncated compressed images $Ic^k_n$ with the resolutions and/or with the quality layers associated with the index $k=k^n_{opt}$ are chosen to be transmitted through the propagation channel to their destination.

The key image $I_0$ which is, for example, the first image of the video stream considered, may be updated during the course of the method. The choice of a new key image $I_0$ may be determined by an entity external to the method and may be modified at any instant. If the current image $I_n$ is defined as key image, then it replaces the previous key image $I_0$ and the method continues in the manner described.

In a variant embodiment of the invention, the key image is updated when the mean distortion, over the set of available resolutions, between the current image $I_n$ and the reconstructed image $IR_n$ is greater than a given threshold. When this threshold is exceeded, the current image $I_n$ becomes the key image $I_0$.

In another variant embodiment of the invention (not represented in FIG. 2), the method furthermore determines the rate of the corrector code to be applied to the truncated compressed image as a function of a signal-to-noise ratio setting for the transmission channel. Indeed if the transmission throughput setting is sufficient, it may be advantageous to increase the throughput of the compressed stream by adding redundancy data so as to protect this stream against transmission errors and thus minimize the distortion of the decoded image.

In an additional step 204bis (not represented in FIG. 2), the calculation of the throughput/distortion pair is furthermore performed for several rates of corrector code applied to each truncation point of index k and each image of index n. Let $R_i$ be the rate of a corrector code, from among the $N_R$ available corrector codes, applied to the truncated compressed image $Ic^k_n$. The index i is used to identify a rate $R_i$ from among those available. The index i can take integer values between 1 and the number of available rates $N_R$. The total throughput consumed by this truncated compressed image is then equal to $$D_n^{i,k} = \frac{D_n^k}{R_i}.$$

The distortion is also recalculated by taking into account the impact of the transmission errors engendered by a propagation channel which exhibits a given probability of error occurrence $P^i_{ae}$ for a corrector code rate $R_i$ and a target signal-to-noise ratio. The probability of error occurrence may be estimated on the basis of curves of probability of error of the corrector code as a function of the signal-to-noise ratio on a Gaussian channel. It can also be measured by means external to the invention. The distortion between the reconstructed image $IR_n$ and the current image $I_n$, taking into account the probability of error occurrence $P^i_{ae}$, can be expressed with the aid of the following relation $\Delta^{i,k}_n = (1-P_{ae}^i)^{T_{n,k,i}} \cdot \Delta^k_n + (1-(1-P_{ae}^i)^{T_{n,k,i}}) \cdot \Delta^k_{0,n}$ with $T_{n,k,i}$ the size, in bits, of the compressed truncated image $Ic^k_n$ protected by the corrector code of rate $R_i$, $\Delta^k_n$ is the distortion previously calculated in step 204 when the impact of the transmission errors is not taken into account and $\Delta^k_{0,n}$ is the distortion engendered when the compressed truncated image $Ic^k_n$ is totally corrupted or lost.

Step 204bis of the method according to the invention therefore culminates, after iteration over the set of available corrector codes, in a list of distortion and throughput pairs $\{\Delta^{i,k}_n, D^{i,k}_n\}$ for each image of index n, each spatial resolution of index k and each corrector code of index i.

Step 205 is thereafter adapted for determining, for each image, not only the optimum truncation point $k''_{opt}$ but also the optimal corrector code rate $i''_{opt}$ so as to minimize the total distortion $$\sum_{n=1}^{N} \Delta_n^{i^n_{opt}, k^n_{opt}}$$

on the video stream while complying with the target throughput constraint given by the inequality $$\sum_{n=1}^{N} D_n^{i^n_{opt}, k^n_{opt}} < D_{target} - D_{I_0}.$$

Step 205 culminates in the determination of the set of pairs of indices $\{k''_{opt}, i''_{opt}\}$. The compressed images truncated $Ic^k_n$ at the truncation points $k=k''_{opt}$ and protected by a corrector code $R_i$ of index $i=i''_{opt}$ are chosen so as to be transmitted through the propagation channel to their destination.

The corrector codes used may be systematic block codes, or convolutional codes. Their rate must be determinable as well as the probability of error occurrence for a binary stream protected by such a corrector code and transmitted on a propagation channel of known signal-to-noise ratio. They may be integrated into the compressed stream by using the redundancy markers provided by the JPWL standard (part 11 of the JPEG 2000 standard).

Figure 3:
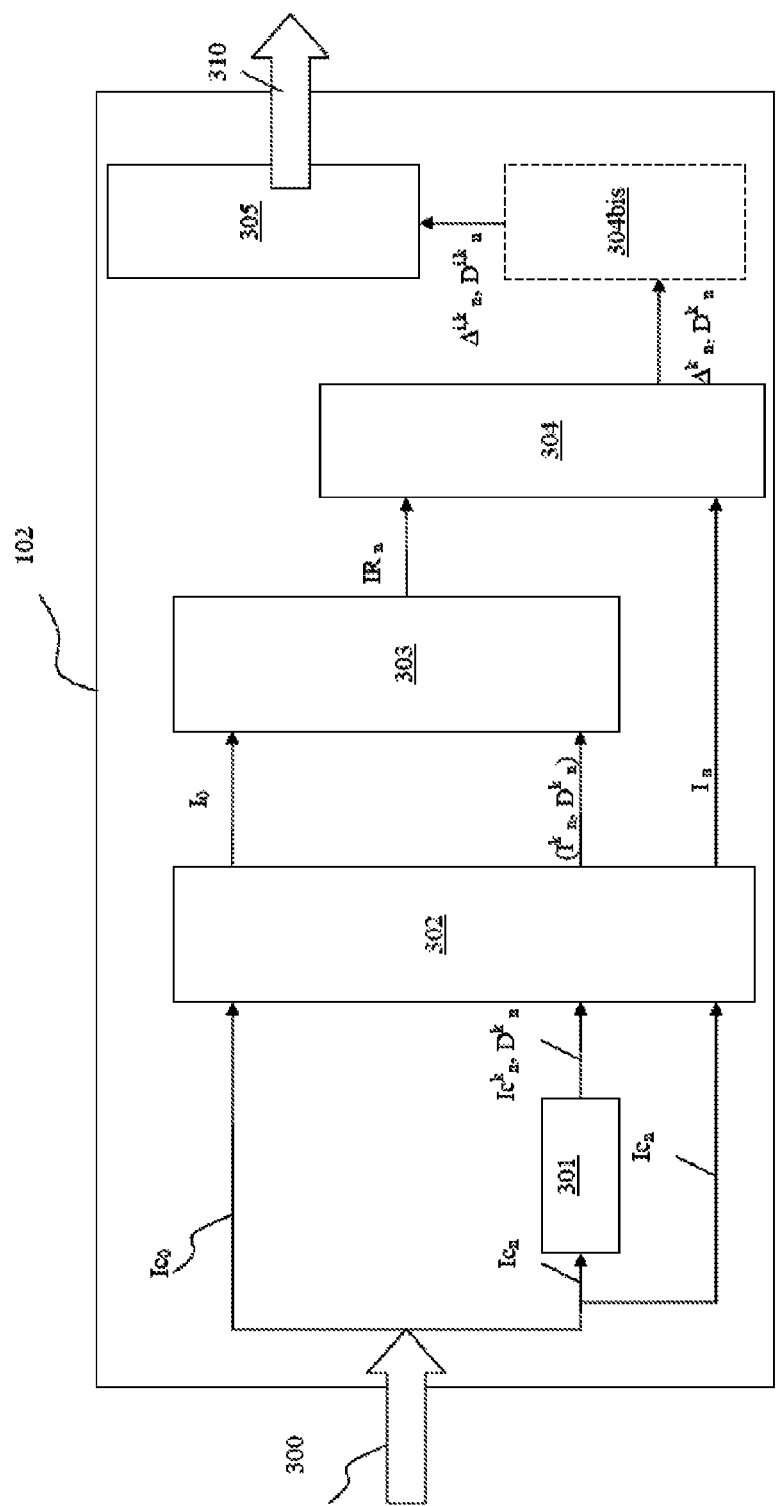

FIG. 3 represents a schematic of the throughput adaptation device 102 according to the invention. The device 102 receives a compressed video stream 300 transmitted by a source coder 101 and produces as output a compressed video stream 310 whose throughput is adapted to the target throughput of the propagation channel 120 by truncation of part of the spatial resolutions and optionally by application of an error-correcting code.

The device 102 according to the invention comprises means adapted to the implementation of the method according to the invention. A key image $I_0$ is determined either by means outside the invention or by the previously described means specific to the invention. A truncation device 301 delivers, on the basis of a compressed image $Ic_n$, a truncated compressed image $Ic^k_n$ with the spatial resolution and/or the quality layer corresponding to the truncation point of index k as well as its associated throughput $D^k_n$. A source decoder 302 carries out the decompression of the key image $Ic_0$, of the current compressed image $Ic_n$ and of the truncated compressed image $Ic^k_n$. A motion estimation and compensation device 303 produces, on the basis of the decompressed key image $I_0$ and of the image $I^k_n$ truncated at the truncation point k, a reconstructed image $IR_n$ with the highest spatial resolution, that is to say that of the key image. The device 303 is advantageously identical to the means implemented by the source decoder 103 to carry out a masking of errors in a decompressed image. The distortion $\Delta^k_n$ between the current image $I_n$ and the reconstructed image $IR_n$ is determined, for each image $I_n$ and each truncation point k envisaged by calculation means 304. In a variant embodiment of the invention, a new distortion $\Delta^{i,k}_n$ and a new throughput $D^{i,k}_n$ are determined, by calculation means 304bis which may or may not be merged with the calculation means 304, for each rate $R_i$ of corrector code applied to the truncated compressed image $Ic^k_n$. Numerical solution means 305 determine the optimum set, according to the invention, of truncation points and of code rates of indices $\{k''_{opt}, i''_{opt}\}$ which make it possible to minimize the mean distortion on the video stream composed of the set of separately compressed images while complying with the setting for maximum throughput available on the transmission channel. The adapted compressed video stream 310 is composed of the compressed images truncated $Ic^k_n$ at the truncation points $k''_{opt}$ determined by the solution means 305 and optionally protected by the corrector codes of rate $R_i$, with $i=i''_{opt}$, which are also determined by the means 305. The stream 310 is thereafter transmitted to its destination.

Without departing from the scope of the invention and as indicated hereinabove, the decomposition of the compressed stream 300 into sub-bands associated with different spatial resolutions may be replaced, without any modification of the method according to the invention, with a decomposition into packets associated with various levels of quality for the same image. The effect of the stream truncation performed in step 301 will not then be to vary the spatial resolution of the image but to vary its quality level.

The invention claimed is:

1. A method for adapting the throughput of a video stream comprising a plurality N of compressed images $Ic_n$ with a plurality of spatial resolutions and/or a plurality of quality layers, said images being compressed separately from one another, said method comprising at least the following steps:

defining at least one key image $I_0$ from among the said images that the stream comprises, for each current compressed image $Ic_n$ and for each truncation point k corresponding to a spatial resolution and/or a quality layer available for this image, executing the following steps:

truncating the said current compressed image $Ic_n$ at the said truncation point k so as to produce a compressed and truncated image $Ic^k_n$ consuming a throughput $D^k_n$, decompressing the compressed key image $Ic_0$, the current compressed image $Ic_n$ and the compressed and truncated image $Ic^k_n$, determining at least one information item regarding compensation of motion between the truncated key image $I^k_0$ and the truncated current image $I^k_n$, applying the said motion compensation information item or items to the key image $I_0$ so as to obtain a reconstructed image $IR_n$ with the spatial resolution and/or quality layer of the key image $I_0$, and determining an estimate of the distortion $\Delta^k_n$ between the reconstructed image $IR_n$ and the decompressed current image $I_n$, determining for all the images $I_n$ of the said video stream, except for the key image or images $I_0$, the optimum truncation points $k^n_{opt}$ which minimize the sum of the distortions $$\sum_{n=1}^{N} \Delta_n^{k^n_{opt}}$$

and which comply with the following inequality $$\sum_{n=1}^{N} D_n^{k^n_{opt}} < D_{target} - D_{I_0},$$

with $D_{target}$ the maximum throughput that can be consumed by the video stream and $D_{I0}$, the throughput consumed by the key image or images $Ic_0$, and producing a throughput-adapted compressed video stream, composed of the key image or images $Ic_0$ and of the compressed images truncated $Ic^k_n$ at the said optimum truncation points $k^n_{opt}$.

2. A method according to claim 1, wherein the distortions $\Delta^k_n$ are determined by a mean square error or PSNR calculation.

3. A throughput adaptation device adapted for receiving a video stream comprising a plurality of compressed images $Ic_n$ with a plurality of spatial resolutions and for delivering a compressed video stream whose throughput is less than a target throughput and whose mean distortion is minimized, said device comprising means for implementing the method according to claim 2.

4. A throughput adaptation device adapted for receiving a video stream comprising a plurality of compressed images $Ic_n$ with a plurality of spatial resolutions and for delivering a compressed video stream whose throughput is less than a target throughput and whose mean distortion is minimized, said device comprising means for implementing the method according to claim 1.

5. A method according to claim 1, further comprising the following steps:

determining, for each current compressed image $Ic_n$, for each truncation point k and for each rate $R_i$ of corrector codes, taken from a given set of corrector codes, the throughput $$D_n^{i,k} = \frac{D_n^k}{R_i}$$

consumed by the said compressed image $Ic_n$ protected by the said corrector code of rate $R_i$, determining, for each current compressed image $Ic_n$, for each truncation point k and for each rate $R_i$ of corrector codes, an estimate of the distortion $\Delta^{i,k}_n$ between on the one hand an image reconstructed $IR_n$ on the basis of the key image $I_0$ and of the compressed, truncated image $Ic^k_n$, protected by the said corrector code and corrupted by errors whose probability of occurrence $P_{ae}$ is known and on the other hand the decompressed current image $I_n$, determining for all the images $I_n$ of the said video stream, except for the key image or images $I_0$, the corrector codes of optimum rates $R_{i_{opt}^n}$ which minimize the sum of the distortions $$\sum_{n=1}^{N} \Delta_n^{i^n_{opt}, k^n_{opt}}$$

and which comply with the following inequality $$\sum_{n=1}^{N} D_n^{i^n_{opt}, k^n_{opt}} < D_{target} - D_{I_0},$$

and producing a throughput-adapted compressed video stream, composed of the key image or images $Ic_0$ and of the compressed images truncated $Ic^k_n$ at the said optimum truncation points $k^n_{opt}$ and protected by the corrector codes of optimum rate $R_{i_{opt}^n}$.

6. A method according to claim 5, wherein the distortion $\Delta^{i,k}_n$ is determined with the aid of the following relation $$\Delta^{i,k}_n = (1-P_{ae}^i)^{T_{n,k,i}} \cdot \Delta^k_n + (1-(1-P_{ae}^i)^{T_{n,k,i}}) \cdot \Delta^k_{0,n},$$

with $P^i_{ae}$ the given probability of error occurrence for a corrector code rate $R_i$ and a target signal-to-noise ratio, $T_{n,k,i}$ the size, in bits, of the compressed truncated image $Ic^k_n$ protected by the corrector code of rate $R_i$ and $\Delta^k_{0,n}$ the distortion engendered when the compressed truncated image $Ic^k_n$ is totally corrupted or lost.

7. A throughput adaptation device adapted for receiving a video stream comprising a plurality of compressed images $Ic_n$ with a plurality of spatial resolutions and for delivering a compressed video stream whose throughput is less than a target throughput and whose mean distortion is minimized, said device comprising means for implementing the method according to claim 6.

8. A throughput adaptation device adapted for receiving a video stream comprising a plurality of compressed images $Ic_n$ with a plurality of spatial resolutions and for delivering a compressed video stream whose throughput is less than a target throughput and whose mean distortion is minimized, said device comprising means for implementing the method according to claim 5.

9. A method according to claim 1, wherein the key image $I_0$ is initially chosen as the first image of the said video stream and is updated to the current image $I_n$ when the distortion $\Delta^k_n$, $\Delta^{i,k}_n$ exceeds a given threshold.

10. A throughput adaptation device adapted for receiving a video stream comprising a plurality of compressed images $Ic_n$ with a plurality of spatial resolutions and for delivering a compressed video stream whose throughput is less than a target throughput and whose mean distortion is minimized, said device comprising means for implementing the method according to claim 9.

11. A method according to claim 1, wherein the images of the said video stream are compressed with the aid of the M-JPEG 2000 standard.

12. A throughput adaptation device adapted for receiving a video stream comprising a plurality of compressed images $Ic_n$ with a plurality of spatial resolutions and for delivering a compressed video stream whose throughput is less than a target throughput and whose mean distortion is minimized, said device comprising means for implementing the method according to claim 11.

* * * * *